United States Patent [19]
Kondo et al.

[11] Patent Number: 5,627,700
[45] Date of Patent: May 6, 1997

[54] FLOATING TYPE MAGNETIC HEAD HAVING FLUSH REAR REFERENCE SURFACE

[75] Inventors: Keiichi Kondo; Masanobu Yamazaki; Ryo Goto; Manabu Toyoda, all of Mooka, Japan

[73] Assignee: Hitachi Metals, Ltd., Tokyo, Japan

[21] Appl. No.: 733,629

[22] Filed: Jul. 22, 1991

[30] Foreign Application Priority Data

Jul. 23, 1990 [JP] Japan ................ 2-078115 U
Nov. 14, 1990 [JP] Japan ................ 2-307881

[51] Int. Cl.$^6$ .................................................. G11B 5/60
[52] U.S. Cl. ............................................................. 360/103
[58] Field of Search ............................... 360/103, 104, 360/119, 125, 126

[56] References Cited

U.S. PATENT DOCUMENTS

| | | | |
|---|---|---|---|
| 4,870,521 | 9/1989 | Okabayashi | 360/103 |
| 4,999,726 | 3/1991 | Goto et al. | 360/125 |
| 5,008,767 | 4/1991 | Iwata et al. | 360/103 |
| 5,010,431 | 4/1991 | Shinohara et al. | 360/103 |
| 5,080,948 | 1/1992 | Morita et al. | 360/103 |
| 5,177,653 | 1/1993 | Shimada | 360/122 |

FOREIGN PATENT DOCUMENTS

| | | |
|---|---|---|
| 0324378 | 7/1989 | European Pat. Off. . |
| 0326140 | 8/1989 | European Pat. Off. . |

OTHER PUBLICATIONS

Patent Abstracts of Japan, vol. 12, No. 220 (p–720) Jun. 23, 1922 and JP–A–63 016 412 (Seiko Epson Corp.) Jan. 23, 1988.
European Search Report.

*Primary Examiner*—Robert S. Tupper
*Assistant Examiner*—Jefferson Evans
*Attorney, Agent, or Firm*—Staas & Halsey

[57] ABSTRACT

A floating type composite magnetic head includes a slider, having an air bearing surface, made of a non-magnetic substance, a magnetic head core which is formed of a pair of magnetic cores defining a magnetic gap, or a pair of magnetic cores having a magnetic gap defined by a butting surface on which is formed a magnetic metallic thin film, and is fixed by bonding glass in a groove provided in a flow-out end of the air bearing of the slider, excitation coils wound in a window section of the head core, and a front gap surface of the magnetic head core being placed so as to oppose the magnetic recording medium. The magnetic head core back surface and the slider rear surface are formed as to be flush at least in the vicinity of the groove, and preferably have a maximum surface roughness of 3 to 8 μm.

4 Claims, 3 Drawing Sheets

FLOATING TYPE MAGNETIC HEAD HAVING FLUSH REAR REFERENCE SURFACE

BACKGROUND OF THE INVENTION

The present invention relates to a floating type magnetic head and a method for producing floating type magnetic heads for use in a small magnetic disk apparatus. More particularly, it relates to a production method for efficiently performing a cutout machining to restrict the track width of a magnetic head core.

As shown in FIG. 2, a floating type magnetic head (hereinafter sometimes referred to as a "magnetic head") comprises a slider 14b having an air bearing 17, a magnetic head core 1c (hereinafter sometimes referred to as a "head core") fixed by glass 13 to the groove 15 at the flow-out end of the air bearing 17, and a coil (not shown) wound around the magnetic head core.

Methods for producing such a magnetic head include a method in which, as regards a magnetic head core 1c, a pair of magnetic cores, for example, made of Mn-Zn ferrite or the like, or a pair of magnetic cores with a non-magnetic film serving as a magnetic gap and a magnetic metallic thin film formed on a butting surface of at least one of the magnetic cores by sputtering or the like, are bonded and reinforced by bonding glass. After a cutout machining to restrict the track width is performed on the side of the front gap, the magnetic core is inserted into the air bearing groove of a slider, and fixed by a molding glass. Thereafter, the air bearing of the slider or the like are finish-machined, and coils are wound around the magnetic head core a predetermined number of turns, and the core is used in a magnetic disk apparatus.

As handy miniaturized lap-top type and notebook type personal computers have come to be used widely, magnetic disk apparatuses in which the number of disks has increased or 2.5-inch magnetic disk apparatuses in which a 3.5-inch magnetic disk apparatus is more miniaturized have been in demand, while the entire size of the conventional apparatus has been kept as it was before.

In response to such demand as described above, floating type magnetic heads must be made smaller. Magnetic heads have been in demand in which a reference height between a rear or back surface of the magnetic core and an apex thereof is made lower particularly in order to lower the height of the magnetic head. For example, as shown in FIGS. 3A and 3B, the reference height 11c (0.864 mm) is made lower to the reference height 11d (0.61 mm).

Although magnetic heads have been miniaturized, from the viewpoint of their function, the window section of the head core needs a minimum required amount of space in which excitation coils can be wound a predetermined number of turns. In addition, the cross section of the head core needs a predetermined area to secure a magnetic circuit. The more the magnetic head is miniaturized, the more important it is that the limited amount of space be used effectively.

If, for example, a head core having a reference height dimension of 0.61 mm is produced by the same process and procedure as that for a conventional head core having a reference height dimension of 0.864 mm, there is a problem in that the quality and yield of the head cores and the efficiency of the process, or the like are lower in, particularly, a cutout machining process for restricting the track width of a head core than those for a head core having the reference height dimension of 0.864 mm.

A standard procedure for producing conventional magnetic heads is as follows: I core blocks or C core blocks which are made of Mn-Zn ferrite or the like produced by a well-known method, or I core blocks and C core blocks with magnetic metallic thin films formed on the butting surface of at least one of the core blocks, are reinforced and bonded by bonding glass; after a predetermined machining is performed, they are sliced to a certain thickness for each head core; and finish-machining, including lapping, is performed. Next, as shown in FIG. 4, a head core is fixed to a vise-type clamp jig via a buffer material, such as rubber, and the track width is restricted by performing cutting machining using a grinding stone.

When restricting the track width, to secure excellent electromagnetic conversion characteristics, a restriction machining for a cutout surface 22 to restrict the track width of a head core should, at least, be performed at a position of an apex 7, and preferably a position 23 which is deeper than the apex 7. Although the reference height dimension is made small to be 0.61 to 0.66 mm, a space of approximately 0.05 mm must be secured from the front gap surface to the apex of the head core before it is incorporated into the slider. Therefore, if a cutout machining to restrict the track width is performed in a state in which the entire head core is machined to have a height of approximately 0.61 mm which is close to a finished dimension, a chuck allowance of no more than 0.3 to 0.4 mm can be secured. Also, since the cross section of the head core is small, it is not tough enough to be fastened by a vise or the like, and hence the head core is deformed, causing warp. The track width does not fall within the tolerance of a prescribed dimension or the like. Also, there is a problem as regards the quality and yield of the head cores and the efficiency of the process, or the like.

As shown in FIG. 6, when the head core 1d in which a cutout machining to restrict the track width has been completed is inserted into the groove 15 of an air bearing flow-out end of the slider 14b and is fixed by a molding glass 13, the alignment of the heights of the slider and the head core requires an accuracy of ±0.005 mm, with the apex serving as a reference. Working conditions are stringent because a clearance between the head core and a side wall which defines a groove can be no more than 0.05 to 0.15 mm. Chipping is caused in the corner of the rear or back surface of the head core at the time of insertion and fixation of the head core, and the cross section of the head core becomes smaller. Thus, there arises a problem in that electromagnetic conversion characteristics of the head core deteriorate or the efficiency of the process becomes lower.

When the air bearing surface is finish-machined after the head core is inserted into the groove of the air bearing of the slider and fixed by a molding glass, a method is also sometimes used in which only a part of side surfaces of the core head near the back gap surface and the side walls which define the groove of the air bearing are bonded by a bonding agent or adhesive to such an extent that they are able to withstand the machining.

Further, in a magnetic head in which only the portion close to the front gap surface is fixed by a molding glass when the head core thereof is inserted into the groove of the air bearing of the slider and fixed by a molding glass and the back gap surface side is in a free state, the amplitude of the vibration transmitted from the slider is amplified and the head core vibrates at a frequency different from that of the slider in an overhung state. The head core expands or contracts in the direction of the height, width and the like thereof, and is deformed, causing a counter magnetostriction phenomenon different from its original magnetized state. The distribution of the magnetization of a magnetic substance forming a magnetic circuit changes, causing the magnetic fluxes of the head core to change. A phenomenon such that the electromagnetic conversion characteristics deteriorate arises often. To prevent such a phenomenon, another method is sometimes employed in which the side surfaces of the head core 1d near the back gap surface are elastically held in the groove of the air bearing by a bonding agent or adhesive, such as a resin 24 or the like, in order that counter magnetostriction can be reduced, as shown in FIG. 7. However, when a bonding agent or resin is made to flow into the side close to the back gap surface, it flows out into the groove before the bonding agent or the like solidifies because the length of the flow-in to the bonded section is small. Thus, a problem remains to be solved, i.e., a sufficient reinforcement cannot be achieved.

When there is a need to hold the side surfaces of the head core near the back gap surface in the groove of the air bearing by using a bonding agent or the like, as described above, the bonding agent or the like adheres on the rear surface of the slider, and the bonding agent or the like solidifies in a projected manner and becomes higher than the rear surface of the slider. Hence, there arises a problem in that the above-described phenomenon hinders the finish-machining of the air bearing or causes deterioration in the accuracy of the air bearing surface.

SUMMARY OF THE INVENTION

It is an object of the present invention to solve the problems of the prior art.

It is another object of the present invention to provide a floating type magnetic head comprising: a slider, having an air bearing surface, made of a non-magnetic substance; a magnetic head core which is formed of a pair of magnetic cores defining a magnetic gap, or a pair of magnetic cores having a magnetic gap defined by a butting surface on which is formed a magnetic metallic thin film, and is fixed by bonding glass to a groove provided in a flow-out end of the air bearing of said slider; excitation coils wound in a window section of the head core; and a front gap surface of the magnetic head core being placed so as to oppose a magnetic recording medium, wherein the head core back surface and the slider rear surface are substantially flush.

According to one aspect of the present invention, the maximum surface roughness of the rear or back surface of the magnetic head core, which is the back gap surface, and at least the periphery of the groove on the rear surface of the slider, is 3 to 8 µm when it is measured by a needle contact type roughness gauge, and the reference height from the rear or back surface of the magnetic head core fixed by a mold inside the groove of the slider before it is finish-machined and the height of the slider are respectively higher than the reference height from the rear surface of the magnetic head core fixed by a mold inside the groove of the slider when it is finish-machined and the height of the slider by 0.1 to 0.3 mm, and the reference height when the flowing type magnetic head which is finish-machined is loaded into a disk apparatus is in the range of 0.61 to 0.66 mm and variations with respect to the chosen reference height is within ±0.025 mm.

It is a further object of the present invention to provide a method for producing a floating type magnetic head in which a reference height dimension from the rear surface on the side of the back gap surface of a magnetic head core to the apex when it is loaded into a magnetic disk apparatus is within the range of 0.61 to 0.66 mm, said method being a method for producing a particularly small composite type floating type magnetic head.

It is still a further object of the present invention to provide a method for producing a particularly small floating type magnetic head, comprising the steps of: providing a large machining allowance of 0.1 to 0.3 mm corresponding to 15 to 45% of a reference height to the rear surface of said back gap surface with respect to a reference height from the rear surface of the back gap surface of a magnetic head core; performing a cutout machining to restrict the track width on the front gap surface of a magnetic head core; providing a machining allowance of 0.1 to 0.3 mm corresponding to 15 to 45% of a reference height, similarly to that described above, to the rear surface of a non-magnetic slider with respect to a reference thickness dimension; inserting the magnetic head core to the groove of the flow-out end of the air bearing of the slider so that the rear surface of the magnetic head core in which the track section on the front gap side is cut out becomes the rear surface of the slider provided with a machining allowance of 0.1 to 0.3 mm with respect to the reference thickness dimension and fixing it by a molding glass; and machining the rear surface of the back gap surface of the magnetic head core and the rear surface of the slider by grinding them simultaneously with a grinding stone, and preferably by one pass, to a reference dimension.

It is still a further object of the present invention to provide a method for producing a particularly small floating type magnetic head, wherein the rear surface of the magnetic head core, and at least the periphery of the groove on the rear surface of the slider are machined in order that the maximum surface roughness thereof are 3 to 8 µm when they are each measured by a needle contact type roughness gauge, and wherein variations of the reference height dimension from the rear surface of the finish-machined magnetic head core to the apex thereof is within ±0.025 mm.

It is still a further object of the present invention to provide, particularly, a floating type magnetic head having high performance and quality, wherein a cutout machining to restrict the track width of a miniaturized head core having a reference height dimension from the rear surface of the head core to the apex thereof is 0.61, 0.635, or 0.66 mm is performed at a high yield efficiently at a mass-production level.

It is still a further object of the present invention to remove a bonding agent which adheres on the rear surface of the slider or a bonding agent which flows between a head core and a groove, which solidifies in a projected manner, and projects from the periphery of the groove on the rear surface of the slider at the same time as when the step-difference between the rear surface of the slider and the head core is machined to be flush, in a magnetic head in which a part of the side close to the back gap surface of the head core and the air bearing groove are in part fixed by a bonding agent in order to cope with a machining load of the head core when the air bearing of the slider is finish-machined, or in a magnetic head in which a portion close to the front gap surface of the head core is fixed by molding glass to the groove, and the groove and the side close to the back gap surface of the head core are elastically held by a bonding agent or the like in order to prevent a counter magnetostriction phenomenon due to an amplified amplitude of the head core.

The present invention can provide a magnetic head in which the reference height from the rear or back surface of the head core before it is finish-machined to the apex and the rear surface of the slider are made higher by approximately 0.1 to 0.3 mm, and by performing machining by one pass, the rear surface of the slider and the back surface of the head core are made to be flush with substantially no step difference, a grinding apparatus and grinding conditions are selected in order that the surface roughness after machining becomes approximately 3 to 8 μm, and chipping of the head core, stripping of magnetic metallic thin films, or the like are prevented, with the result that the air bearing can be finish-machined with a high degree of accuracy.

In addition, in the present invention, particularly, the common use of a large number of jigs is made possible by a method in which the entire height of a head core is made higher by using a head core which is 0.1 to 0.3 mm higher than a reference height dimension before the head core is finish-machined and a cutout machining is performed, and in which, after it is incorporated into the slider, the reference height is made to be height of 0.61 to 0.66 mm by performing a run-on machining. The reason why variations with respect to the reference height are limited to the range of ±0.025 mm is that both the performance as a magnetic head and the accuracy during machining are considered.

The reasons why the surface roughness is limited to 3 to 8 μm are as follows: the rear surface of the slider does not require accuracy to the extent that a lapping operation is performed unlike that for the air bearing; when machining by grinding with a grinding stone is taken into account, a surface roughness of 3 μm or greater is proper. The reasons why the surface roughness is made to be 8 μm or less is that, if it is 8 μm or more, chipping or the like often undesirably occurs.

DESCRIPTION OF THE PREFERRED EMBODIMENTS (First Embodiment)

Figure 1A:
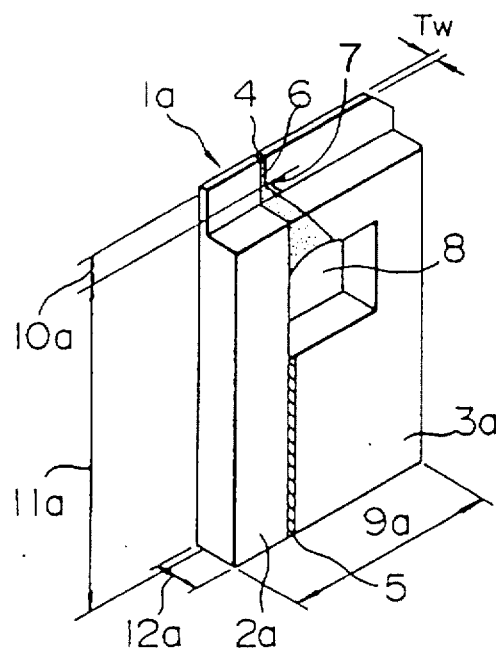
FIG. 1A is a perspective view showing a head core of a magnetic head of the present invention when a step machining to restrict the track width is completed.

FIGS. 1A, 1B, 1C, and 1D show an embodiment of the present invention. FIG. 1A is a perspective view showing a head core 1a before it is incorporated into a slider after an intermediate process for a head core having a reference height dimension of 0.61 mm when it is inserted into a disk, i.e., a cutout machining to restrict the track width, has been completed. A width $9a$ is 1.12 mm; a thickness $12a$ is 0.20 mm; dimensions $10a$ and $11a$ from the front gap surfaces 4 and 5 to an apex 7 are respectively 0.05 and 0.81 mm, and dimension $11a$ from the front gap surface 5 to the apex 7 is greater than the reference height dimension by 0.2 mm.

Figure 1C:
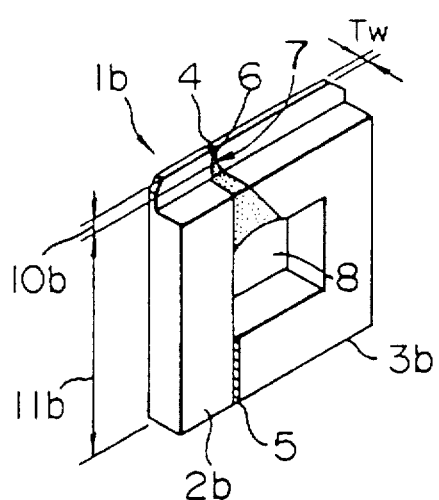
FIG. 1C is a perspective view showing a finish-machined head core.
Figure 1B:
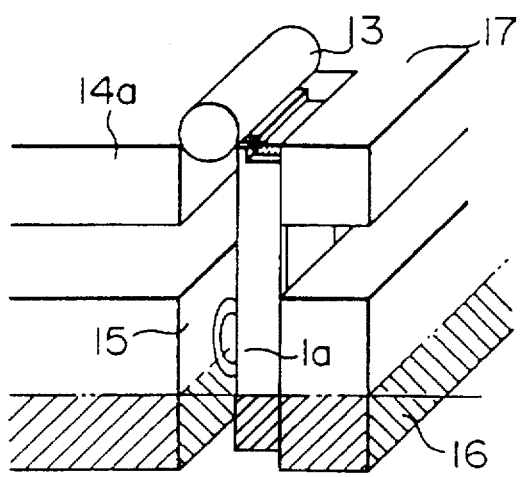
FIG. 1B is a perspective view showing a state in which the head core is inserted into the groove of a slider and fixed.

FIG. 1B is a perspective view of a magnetic head, showing a state in which the head core $1a$ shown in FIG. 1A is inserted into a groove 15 of an air bearing and fixed by molding glass 13. The rear or back surface of the head core $1a$ and the rear surface of the slider $14a$ is approximately 0.2 mm larger than when they are finish-machined.

Figure 1D:
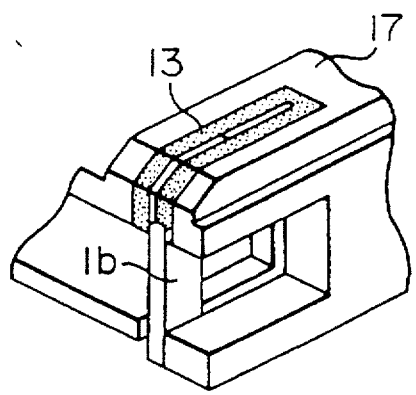
FIG. 1D is a perspective view showing the essential portion of the finish-machined magnetic head.
Figure 2:
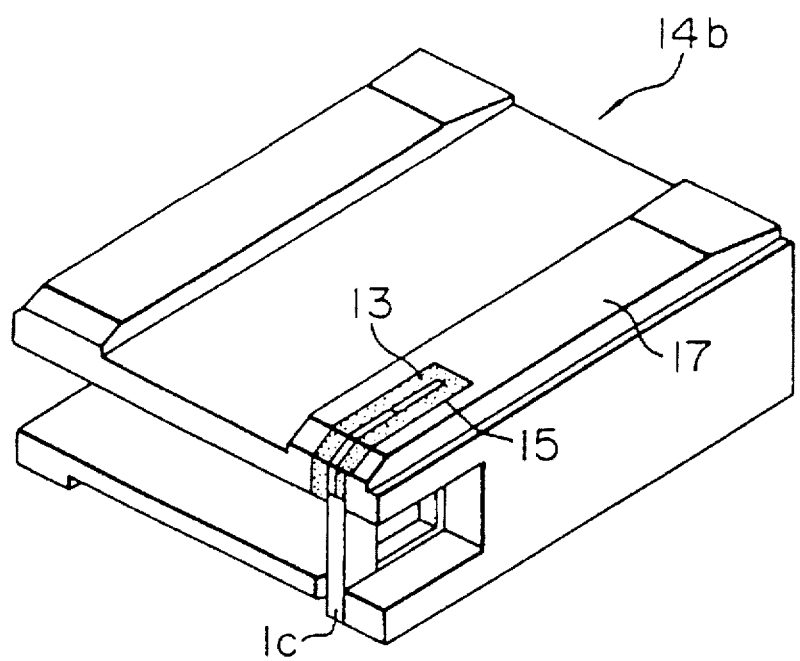
FIG. 2 is a perspective view of a conventional flowing type magnetic head.
Figure 3A:
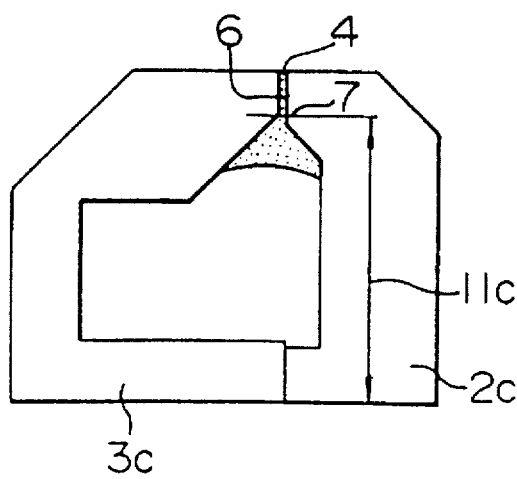
FIG. 3A is a view showing a conventional head core.
Figure 3B:
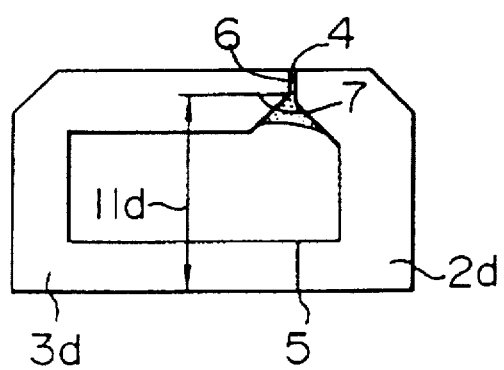
FIG. 3B is a view showing a head core of the present invention.
Figure 4:
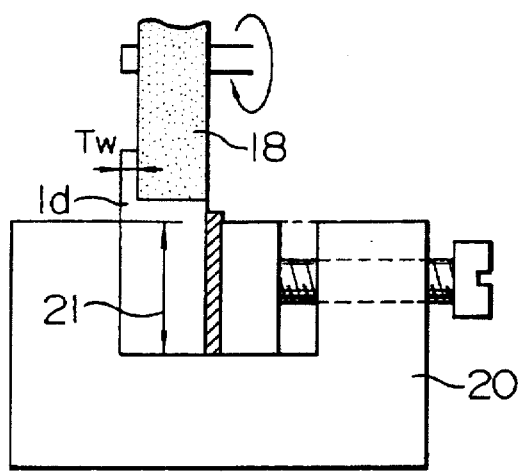
FIG. 4 is a view showing a state in which the head core is fixed at the time of a cutout machining.
Figure 5:
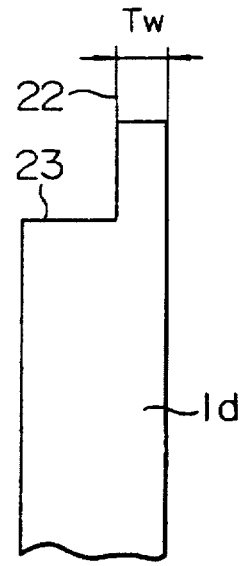
FIG. 5 is a view showing the positional relationship between the track width and the apex.
Figure 6:
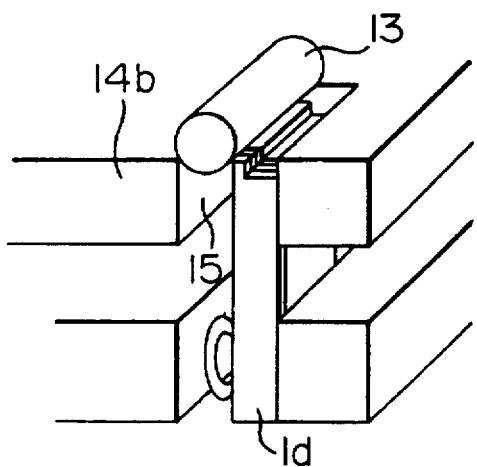
FIG. 6 is a view showing a state in which the head core is fixed to the slider.
Figure 7:
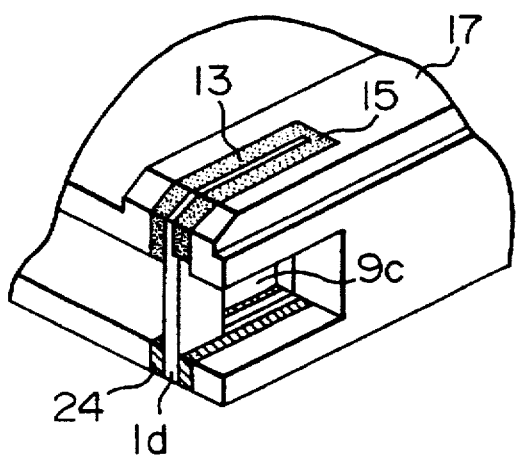
FIG. 7 is a perspective view showing the essential portion of the magnetic head with the rear or back surface of the head core elastically held by a resin or the like to prevent a counter magnetostriction phenomenon.

FIG. 1C is a perspective view showing the state of the head core $1b$ when the air bearing of the slider and the slider are finish-machined. The reference height dimension of the head core is 0.61 mm and its variations are within the range of ±0.025 mm. The dimension from the front gap surface 4 to the apex 7 is 0.004 mm when machined. FIG. 1D is a perspective view showing the finish-machined magnetic head. The head core $1b$ and the slider have been machined and formed into a normal shape and dimension.

(Second Embodiment)

Cutout machining to restrict the track width was performed by changing machining allowances provided on the back gap surface side with respect to each head core; head cores whose reference height dimension are 0.61, 0.635, and 0.66 mm when they are loaded into a magnetic disk apparatus and a conventional head core having a reference height dimension of 0.864 mm. Next, the cutout-machined head core is incorporated into the slider and a back grinding was performed.

Cutout machining and back grinding for a track section are both a creep field machining of one pass of upcut. Their machining conditions are as listed below:

A cutout machining for a track section
    Grinding stone: SD#4,000 resin grinding stone
    Grinding stone diameter: Φ120
    Number of rotations: 6,000 rpm
    Feed speed: 5 mm/min. (constant)
Back grinding machining
    Grinding stone: SD#200 resin grinding stone
    Grinding stone diameter: Φ120
    Number of rotations: 6,000 rpm
    Feed speed:
        A: 200 mm/min.
        B: 15 mm/min.
        C: 10 mm/min.
The results of the machining are shown in Table 1.

TABLE 1

| | Reference dimension (H mm) | Finishing allowance (S mm) | Machining dimension (H + S mm) | Rate (S/H) | Track machining | | Back grinding | | Overall evaluation |
|---|---|---|---|---|---|---|---|---|---|
| | | | | | Man-hour | Yield | Conditions | Man-hour | |
| Comparative example 1 | 0.610 | 0.02 | 0.630 | 0.031 | 400 | 90 | — | 0 | x |
| Comparative example 2 | 0.610 | 0.05 | 0.660 | 0.081 | 400 | 95 | A | 100 | Δ |
| The present invention 1 | 0.610 | 0.15 | 0.725 | 0.245 | 200 | 98 | B | 150 | ○ |
| The present invention 2 | 0.610 | 0.25 | 0.860 | 0.409 | 100 | 100 | C | 200 | ⊚ |
| The present invention 3 | 0.610 | 0.30 | 0.910 | 0.412 | 100 | 100 | C | 200 | ⊚ |
| Comparative example 3 | 0.635 | 0.10 | 0.735 | 0.157 | 200 | 98 | B | 150 | ○ |
| The present invention 4 | 0.635 | 0.20 | 0.835 | 0.315 | 100 | 100 | C | 200 | ⊚ |
| Comparative example 4 | 0.660 | 0.08 | 0.668 | 0.121 | 400 | 95 | A | 100 | Δ |
| The present invention 5 | 0.660 | 0.15 | 0.810 | 0.227 | 100 | 100 | B | 150 | ⊚ |
| The present invention 6 | 0.660 | 0.25 | 0.910 | 0.379 | 100 | 100 | C | 200 | ⊚ |
| Comparative example 5 | 0.864 | 0.02 | 0.884 | 0.020 | 100 | 100 | — | 0 | |

Note:
The man-hours and yield of the track machining: relative values when the reference height 0.864 mm of a conventional core is set to 100, the man-hours include a setup. The man-hours of the back grinding is a relative value when the grinding condition A is set to 100, and is the net machining man-hours. Each of the symbols in the overall evaluation indicates the following: ⊚: very good, ○: good, Δ: slightly bad, and x: bad.

The cutout machining to restrict the track width does not differ among head cores, because the dimension of the shape before and after the machining is the same. However, the fixation and centering by a vise as a set-up at the time of machining, and the yield of good products after the machining differ greatly depending upon the entire height of each head core to be fixed. As regards the cutout machining, it is important that handling is made easy by providing a machining allowance to the rear surface of the head core.

However, if the machining allowance provided is too much when a cutout-machined head core is incorporated into the slider and a back grinding is performed, a limitation on the feed speed at the time of creep grinding becomes too large, which is disadvantageous.

Therefore, it is an important factor at the mass-production level as in the present invention that a cutout machining to restrict the track width is performed by providing a machining allowance of 0.1 to 0.3 mm, 15 to 45% of the reference height dimension, with respect to the reference height dimension of the head core when it is loaded into a magnetic disk apparatus, and the machining allowance is removed by one pass by a back grinding.

(Third Embodiment)

Table 2 compares the relationships among the grinding conditions, a grinding stone and surface roughness, and the yield when a back grinding is performed when the grinding allowance of the head core is approximately 0.2 mm, from 0.81 mm (before machining) to 0.61 mm and the slider has the same grinding allowance. Every grinding machining is performed by one pass. When the surface roughness is within the range of 3 to 8 μm, as shown in Table 2, chipping of the head core is small. Hence, it is possible to efficiently produce magnetic heads at the mass-production level.

TABLE 2

| | Grinding Conditions | Grinding Stone | Surface Roughness | Yield |
|---|---|---|---|---|
| 1 | Down cut | #200 | 8.5 μm | 81% |
| 2 | Down cut | #400 | 7.2 μm | 90% |
| 3 | Down cut | #600 | 3.8 μm | 92% |
| 4 | Up cut | #200 | 7.8 μm | 88% |
| 5 | Up cut | #400 | 5.7 μm | 96% |
| 6 | Up cut | #600 | 4.8 μm | 95% |

In the present invention, ingenuity and contrivance are applied to the production process and procedure, and the shape dimension of a head core and a slider during an intermediate process. As a result, it is possible to provide miniaturized magnetic heads, particularly magnetic heads whose height is made low, having high performance and quality.

What is claimed is:

1. A floating type magnetic head comprising:

a non-magnetic slider having an air bearing surface and a rear surface;

a magnetic head core formed of a pair of magnetic core elements defining a magnetic gap or of a pair of magnetic core elements having a magnetic gap defined by a butting surface on which is formed a magnetic metallic thin film, said head core having a front gap surface, a back surface and a window section, and being fixed by bonding glass within a groove provided in a flow-out end of the air bearing surface of said slider, said groove extending through said rear surface; and an excitation coil wound in said window section, said front gap surface being placed so as to oppose a magnetic recording medium, said back surface and a portion of said rear surface adjacent said groove being flush, wherein said back surface is a back gap surface, said back gap surface and said portion of said rear surface each having a maximum surface roughness of 3 to 8 μm when measured by a needle contract type roughness gauge.

2. A floating type magnetic head as set forth in claim 1, which has a finish machined reference height in the range of from 0.61 to 0.66 mm and variations with respect to said height are within ±0.025 mm.

3. A floating type magnetic head comprising:

a non-magnetic slider having an air bearing surface and a rear surface;

a magnetic head core formed of a pair of magnetic core elements defining a magnetic gap or of a pair of magnetic core elements having a magnetic gap defined by a butting surface on which is formed a magnetic metallic thin film, said head core having a front gap surface, a back surface and a window section, and being fixed by bonding glass within a groove provided in a flow-out end of the air bearing surface of said slider, said groove extending through said rear surface; and an excitation coil wound in said window section, said front gap surface being placed so as to oppose a magnetic recording medium, said back surface and a portion of said rear surface adjacent said groove being flush, wherein the rear surface of said slider and the back surface of said head core are characterized by having been worked down by finish machining by an amount of 0.1 to 0.3 mm.

4. A floating type magnetic head comprising:

a non-magnetic slider having an air bearing surface and a rear surface;

a magnetic head core formed of a pair of magnetic core elements defining a magnetic gap or of a pair of magnetic core elements having a magnetic gap defined by a butting surface on which is formed a magnetic metallic thin film, said head core having a front gap surface, a back surface and a window section, and being fixed by bonding glass within a groove provided in a flow-out end of the air bearing surface of said slider, said groove extending through said rear surface; and an excitation coil wound in said window section, said front gap surface being placed so as to oppose a magnetic recording medium, said back surface and a portion of said rear surface adjacent said groove being flush, said head having a finish machined reference height in the range of from 0.61 to 0.66 mm and variations with respect to said height are within ±0.025 mm.

* * * * *

UNITED STATES PATENT AND TRADEMARK OFFICE
CERTIFICATE OF CORRECTION

PATENT NO. : 5,627,700
DATED : May 6, 1997
INVENTOR(S) : Keiichi Kondo et al

It is certified that error appears in the above-indentified patent and that said Letters Patent is hereby corrected as shown below:

Column 8
 Table 1, col. 10, line 25 of table, insert symbol "⊚".

Signed and Sealed this

Sixteenth Day of September, 1997

Attest:

BRUCE LEHMAN

Attesting Officer

Commissioner of Patents and Trademarks